Patented Apr. 27, 1948

2,440,256

UNITED STATES PATENT OFFICE 2,440,256

PRODUCTION OF THERMOPLASTIC POLYMERIC MATERIAL

Henry Dreyfus, London, England; Claude Bonard, administrator of said Henry Dreyfus, deceased, assignor to Celanese Corporation of America, a corporation of Delaware No Drawing. Application August 2, 1944, Serial No. 547,805. In Great Britain July 26, 1943

1 Claim. (Cl. 260—83)

This invention relates to thermoplastic polymeric material and in particular to material of the kind specified having a basis of a polymerised olefinic compound and a plasticiser therefor, and to the production of such material.

Polymeric material of the kind referred to above, for example compositions comprising polymethyl methacrylate or other polymerised monomer having a basis of acrylic acid or a derivative thereof, together with a plasticiser, are largely used as moulding stock for the production of articles by injection moulding, or compression moulding at an elevated temperature. For this purpose such polymeric material is commonly employed in powder form. The present invention provides a simple method of obtaining the polymeric material in the form of a powder or of a friable mass that can easily be reduced to a powder.

According to the present invention the polymerisation is brought about while the olefinic substance is in solution in a homogeneous liquid medium comprising water and a water-soluble volatile liquid which is a solvent for the polymer, said liquid medium being such that on evaporation it progressively loses solvent power for the polymeric material, and the polymeric material is obtained in granular or friable form by evaporating said medium from the reaction mixture after polymerisation. It is frequently of advantage for the polymeric material to contain a plasticiser for the polymer. Such plasticised material can be obtained according to the invention by dissolving a suitable plasticiser in the liquid medium.

Preferably the olefinic substance is an aliphatic ester containing a single olefinic group, the polymerisation is carried out in a closed vessel at super-atmospheric temperature and using an organic peroxide as catalyst, and the volatile liquid is a compound of carbon, hydrogen and oxygen which does not contain a hydroxyl group and is stable in the presence of the peroxide.

The solvent power of the liquid medium for the polymeric material (i. e., for the polymer plus plasticiser or for the polymer alone when no plasticiser is employed) may be varied by varying the proportion of water in the liquid medium. The best results have been obtained when the proportion of water in the liquid medium is sufficiently high (and the solvent power in consequence sufficiently low) for precipitation of the polymeric material to occur when the reaction mixture is cooled from the temperature at which polymerisation has been carried out, to ordinary temperature even before any evaporation has occurred. During evaporation, owing to preferential loss of the volatile liquid, the solvent power of the liquid medium is progressively still further reduced. The solvent power of the liquid medium may, on the other hand, be so low initially that some separation of polymeric material occurs even at the temperature of polymerisation; or the solvent power may be sufficiently high for the polymeric material to remain in solution even when the reaction mixture is cooled to ordinary temperature, precipitation occurring as the liquid medium is evaporated.

It is of advantage to work with highly concentrated solutions, i. e., solutions in which the monomer is dissolved in less than its own weight of the liquid medium. The best results have been obtained under the following conditions: in the initial reaction mixture the weight of the liquid medium (water plus volatile liquid) is between about 50% and about 100% of the weight of the monomer; this reaction mixture forms two liquid phases at ordinary temperature but becomes homogeneous at the temperature at which polymerisation is carried out; at the end of the polymerisation process the reaction mixture consists of a large body of viscous liquid containing the bulk of the polymeric material together with a very much smaller body of supernatant liquid; and during cooling of this large body of liquid to ordinary temperature precipitation of the polymeric material (polymer plus plasticiser) occurs.

The invention may be illustrated in connection with the production of a moulding powder comprising polymethyl methacrylate plasticised with dimethyl phthalate. For this purpose a reaction mixture of the following composition may be made, the parts being by weight:

| | Parts |
|---|---|
| Methyl methacrylate | 125 |
| Dimethyl phthalate | 10 |
| Acetone | 64 |
| Water | 23.5 |
| Benzoyl peroxide | 3.3 |

The reaction mixture may be made by mixing the monomer, plasticiser and acetone, adding the catalyst, filtering the solution and introducing the specified proportion of water. In the cold this reaction mixture forms two liquid phases but on heating, the solution becomes homogeneous. Polymerisation may be carried out at about 100° C. and it is preferred to continue the reaction for about 16 hours so as to ensure substantially complete polymerisation of the monomer. The acetone is then rapidly removed from the reaction mixture by vaporisation, preferably under reduced pressure, with frothing, leaving a friable mass which can easily be crumbled into a powder with the desired fineness without any substantial expenditure of power. This powder is then dried free from water and is ready for use.

It will be observed that this process enables the moulding powder to be produced without a power-consuming grinding operation such as is necessary when moulding powders are formed from the tough, solid masses of plasticised polymer obtained by incorporating the plasticiser with the aid of solvents; the complications of the emulsion method of polymerisation are avoided; separation of the moulding powder from the liquid medium in which the reaction is carried out is very simple and does not involve the use of any liquid which might remove a part of the plasticiser as do, for example, processes in which the plasticised polymer is precipitated from solution in a liquid paraffin medium which must subsequently be removed from the powder by washing with a more volatile liquid hydrocarbon. Seasoning of articles moulded from the moulding stock of the invention is not in general necessary since substantially the whole of the volatile solvent is readily removed from the powder by vaporisation.

It is not essential to employ the various constituents in the proportions specified; thus for example the proportions of water to acetone can be varied so long as the resulting mixture remains a solvent for the monomer, plasticiser and catalyst at the temperature of polymerisation and either a non-solvent for the plasticised polymer at ordinary temperatures or a solvent therefor which becomes a non-solvent on losing a proportion of the acetone.

Instead of acetone, we may employ other volatile solvents for the polymer which are miscible with water and are compounds of carbon, hydrogen and oxygen which do not contain hydroxyl groups and are stable in the presence of the catalyst employed. The volatile solvent may, for example, be an ester such as methyl acetate, or an ether such as methylal or methylene ethylene ether, or an aliphatic ketone such as methyl ethyl ketone.

Other plasticisers can be employed instead of dimethylphthalate, e. g., diethyl phthalate, dibutyl phthalate, di-(methoxyethyl) phthalate, methyl-phthallyl ethyl glycollate, tricresyl phosphate and tri-(monochlorethyl) phosphate. Plasticisers which are soluble to a substantial degree in water, are of course, unsuitable.

The invention has been described with particular reference to the use of methyl methacrylate as the monomer. We may, however, employ other olefinic substances which are capable of forming solid polymers. Among such olefinic compounds are ethyl acrylate and other esters of acrylic acid and its alkyl derivatives, vinyl acetate and similar compounds containing a vinyl group. Preferably the olefinic substance has the formula $CH_2=CHR_1COOR_2$ where $R_1$ is hydrogen or an aliphatic hydrocarbon residue and $R_2$ is an aliphatic hydrocarbon residue and the invention is of special importance in connection with the polymerisation of esters of methacrylic acid. Co-polymerisation of two or more olefinic monomers may be effected according to the process of the invention.

In conducting the polymerisation, other catalysts than benzoyl peroxide may be employed. For example, other organic peroxides and peracids, for example peracetic acid may be used; or polymerisation may be effected without a catalyst, for example by irradiation with ultra-violet light.

The principle of obtaining polymers of the kind referred to in the form of a powder or of a friable material which can easily be reduced to a powder, by removal of a volatile solvent for the polymer, by vaporisation from a solution of that polymer, with or without a plasticiser therefor, in a homogeneous mixture of the volatile solvent and water, is believed to be broadly novel.

Having described my invention, what I desire to secure by Letters Patent is:

Process for the solution polymerization of methyl methacrylate, which comprises effecting said polymerization in a reaction medium comprising aqueous acetone, containing a plasticizer for the polymer, in an amount equal to 50 to 100% of the weight of the monomer, the ratio of acetone to water being about 8:3 the polymerization being carried out in a closed vessel at about 100° C. in the presence of a peroxide polymerization catalyst in solution, until substantially all the monomer is converted to polymer, all the polymer formed remaining in solution at the polymerization temperature although the reaction medium is not capable of holding the polymer in solution at atmospheric temperature, and then recovering the polymer in friable form by the evaporation of the acetone.

HENRY DREYFUS.

REFERENCES CITED

The following references are of record in the file of this patent:

UNITED STATES PATENTS

| Number | Name | Date |
|---|---|---|
| 2,072,904 | Ries | Mar. 9, 1937 |
| 2,121,839 | Strain | June 28, 1938 |
| 2,129,662 | Barrett et al. | Sept. 13, 1938 |
| 2,135,443 | Strain | Nov. 1, 1938 |
| 2,205,883 | Graves | June 25, 1940 |

FOREIGN PATENTS

| Number | Country | Date |
|---|---|---|
| 482,701 | Great Britain | Apr. 4, 1938 |